United States Patent [19]

Schock, Jr. et al.

[11] Patent Number: 5,750,161
[45] Date of Patent: May 12, 1998

[54] QUICK CHANGE MOLD TOOLING

[75] Inventors: Richard J. Schock, Jr., Miamisburg; Charles J. Brun, Jr., Xenia, both of Ohio

[73] Assignee: Electra Form, Inc., Vandalia, Ohio

[21] Appl. No.: 435,699

[22] Filed: May 5, 1995

[51] Int. Cl.[6] ................................. B29C 45/03
[52] U.S. Cl. .................... 425/468; 425/577; 425/595
[58] Field of Search ............................. 425/468, 577, 425/595

[56] References Cited

U.S. PATENT DOCUMENTS

| | | | |
|---|---|---|---|
| 4,059,249 | 11/1977 | Galer | 249/58 |
| 4,472,128 | 9/1984 | Ruhl | 425/186 |
| 4,500,275 | 2/1985 | Ruhl | 425/185 |
| 4,544,340 | 10/1985 | Hehl | 425/183 |
| 4,684,101 | 8/1987 | Wagner et al. | 425/193 |
| 4,702,455 | 10/1987 | Imbert | 425/468 |
| 4,911,632 | 3/1990 | Mansfield | 425/183 |

*Primary Examiner*—Thomas R. Weber
*Attorney, Agent, or Firm*—Locke Reynolds

[57] ABSTRACT

A mold core assembly for removable installation in a molding machine includes a first lock element attached to a core and a second lock element movably attached to a core retainer. The second lock element is movable between a locked position fitted in locking connection with the first lock element and an unlocked position separated from the first lock element. A slip ring surrounds the first lock element of the core, engaging and holding the second lock element in its locked position. A spring is connected between the core retainer and the slip ring, with the spring biased to oppose movement of the slip ring away from its locked position so that the core is normally held in its locked position in the core retainer.

12 Claims, 5 Drawing Sheets

QUICK CHANGE MOLD TOOLING

BACKGROUND OF THE INVENTION

The present invention relates to a mold assembly for a plastic molding machines. More particularly, the present invention relates to a mechanism for supporting a mold core or die in an injection molding machine or for supporting a push-up in a blow molding machine which allows for its quick replacement.

To reduce downtime of injection molding machines it has long been known to construct the machines, at least in part, with component assemblies that can be quickly pulled and replaced. Such component assemblies effectively reduce machine downtime and simplify replacement, repair or maintenance of the injection molding machine.

Because of the need for replacement before starting new production runs, mold cores or die assemblies are often designed to be modular and interchangeable. Conventionally, the mold cores are individually attached to stationary or movable die carriers or mold bases in a mold core closing unit. This attachment can utilize clamping pins, wedges, or involve attachment of oversize back plates to carrier plates or platens.

One example of an attachment mechanism for interchangeable mold dies is disclosed in U.S. Pat. No. 4,544,340 to Hehl. Hehl illustrates a mechanism for clamping mold dies to die carrier plates that involves use of a clamping plunger and a self locking wedge rod. However, the disclosed mechanism for holding the mold dies is complex and unwieldy, and its use would still require substantial machine downtime during replacement of the mold die.

What is needed is a reliable, quick change mold core assembly that can be easily disassociated from the injection molding machine. This assembly should not require the removal of the mold backing plates from the injection molding machine, and should allow attachment that maintains the required space tolerances without substantial movement.

SUMMARY OF THE INVENTION

The present invention provides such a quick change, durable, and reliable mold core assembly for removable installation in an injection molding machine in such a way that a mold core can be replaced without removal of associated portions of the assembly from the machine. The mold core assembly includes first lock element attached to a core and a second lock element movably attached to a core support which is coupled to a base plate fixed to the machine. The second lock element is movable between a locked position fitted in locking connection with the first lock element and an unlocked position separated from the first lock element. A slip ring is positioned to surround the first lock element of the core and engage and hold the second lock element in its locked position, while a spring is positioned between the core retainer and the slip ring. This spring is biased to oppose movement of the slip ring away from its locked position.

In one preferred embodiment, the first lock element includes a circumferentially extending peripheral groove defined by the core. The second lock element consists of a plurality of balls sized to fit within the peripheral groove defined by the core. These balls are held in locked position within the peripheral groove by a slip ring having an upper edge and a lower lip. The slip ring is positioned to surround the peripheral groove of the core, with the slip ring including slots that can accommodate projecting pins extending from the core support.

The slip ring is longitudinally movable between an unlocked position with projecting pins fitted into slots in the slip ring to allow the plurality of balls to move out of the peripheral groove and permit removal of the core from its connection to the core support, and a locked position with the slip ring rotated from its unlocked position to bring the upper edge of the slip ring into contact with projecting pins, holding the balls in locked connection between the slip ring and peripheral groove of the core. The lower lip of the slip ring is angled to extend away from the core, with upward longitudinal movement of the slip ring in its unlocked position bringing the lower lip adjacent to the balls held in the peripheral groove and defining a cavity for the balls to drop therein and unlock the core from the core retainer.

One feature of the present invention is the ready replaceability of one core with another by simply manipulating the slip ring against the biasing forces of the spring to unlock the ring and retract the engaged balls while the core retainer remains fixed in the injection molding machine. The feature has the advantage of permitting very quick changes of mold cores without the need of special tools or the removal of mold bases from the machine.

Another feature of the present invention is the use of a similar slip ring locking structure to engage a spacing element which sets the position of mold elements other than the core in relation to the core retainer. This has the advantage of eliminating any need for the alignment of the other mold elements when one mold core is replaced with another of a different dimension.

Yet another feature of the present invention is the use of a similar slip ring locking structure to engage a push-up mold portion of a blow mold used in the production of bottles or other similar goods. This feature can advantageously be used to modify the location of a push-up mold portion in the event the length of the bottle is changed by incorporating an extension unit also employing the slip ring locking structure.

Further features and advantages of the present invention will become more apparent upon consideration of the accompanying claims, drawings, and the following description of those drawings which illustrate preferred embodiments of the invention.

DETAILED DESCRIPTION OF THE INVENTION

Figure 1:
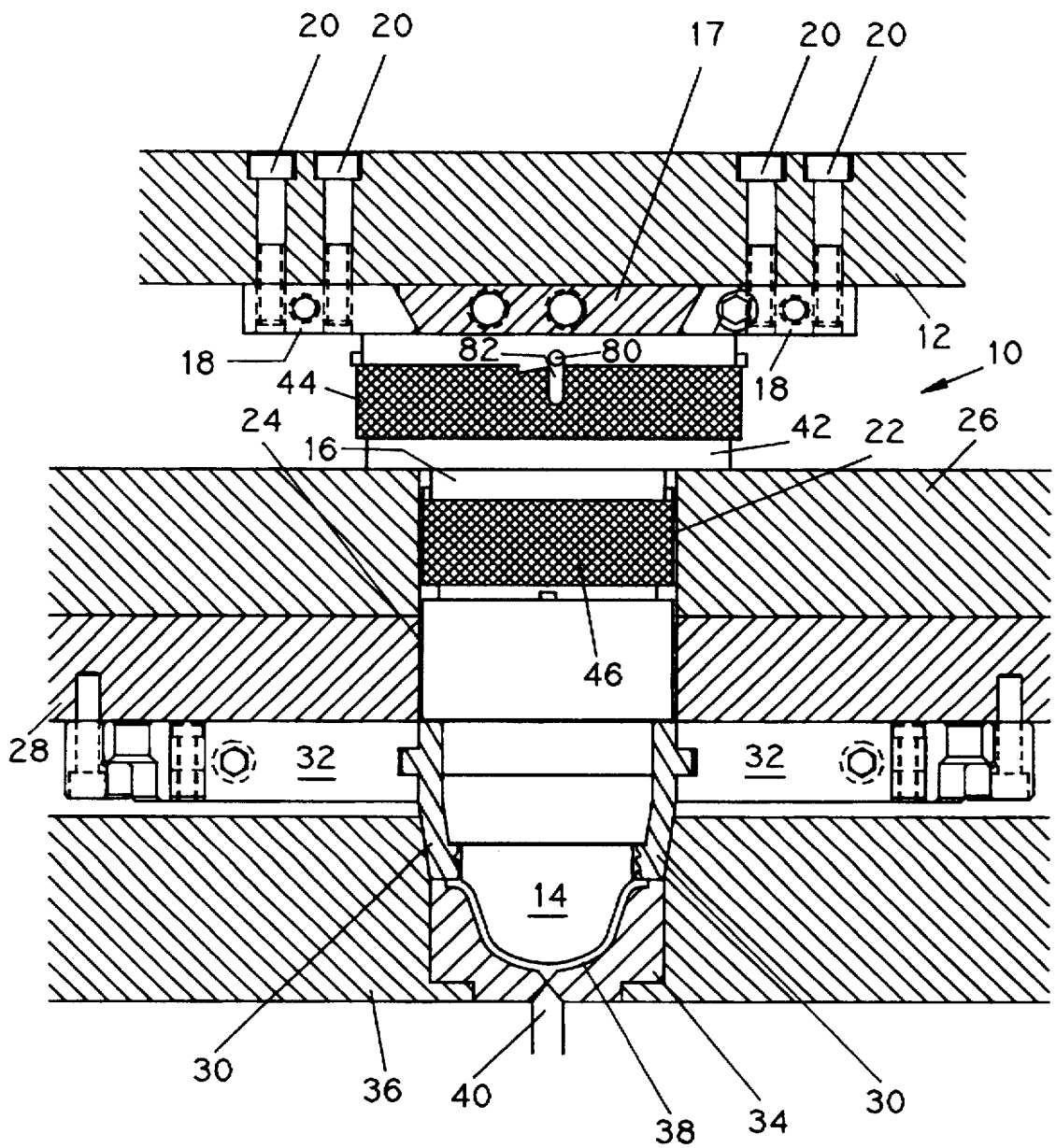
FIG. 1 is a side elevation view of a mold core assembly employing the quick change features of the present invention shown in a portion of an injection blow molding machine.

A quick change mold core assembly 10 of the present invention is shown in FIG. 1 removably attached to a core plate 12 of an injection blow molding machine. The quick change mold core assembly 10 includes a core 14 coupled to a core retainer 16 by coupling ring 46. A tailpiece 17 of the core retainer 16 is fixed to core plate 12 by a pair of dovetail plates 18 secured in place by fasteners 20.

The core retainer 16 and core 14 project downwardly through openings 22 and 24 existing in rotor plate 26 and thread split support plate 28, respectively. A pair of thread splits 30 are secured to arms 32 carried by the support plate 28, the arms 32 being are movable with respect to support plate 28 and each other for releasing a completed article molded by the machine.

A mold cavity 34 is carried by cavity plate 36 and is designed in conjunction with the core 14 to define, when positioned as shown in FIG. 1, a space 38 into which molten plastic is injected through gate 40. The conformation of the confronting core 14 and cavity 34, as well as the mating thread splits 30 combine together to define the shape of the article to be molded. It is important that the core 14 be properly positioned with respect to the cavity 34 and thread splits 30. To assure the correct positioning, a spacer ring 42 is coupled to the core retainer 16 by coupling ring 44.

The cavity plate 36 and core plate 12 are reciprocable vertically with respect to each other and with respect to thread split support plate 28. Between molding operations, the core plate 12 is moved vertically so that the core is removed from the openings 22 and 24 to permit the thread split support plate 28 to rotate horizontally to carry the article molded between the core 14 and cavity 34 to subsequent molding stations (not illustrated) where the article conformation can be modified by blow molding or other operations.

Figure 2:
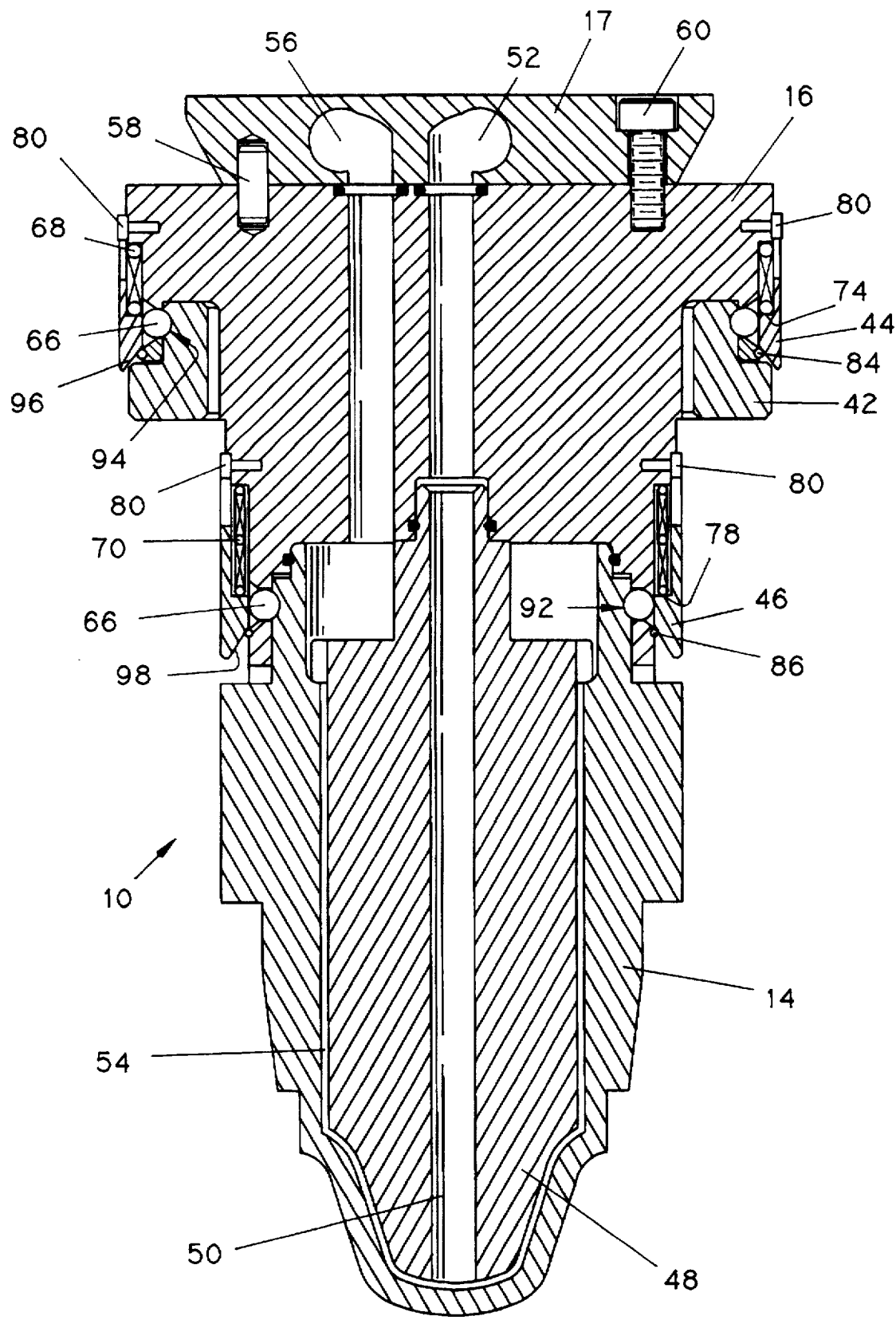
FIG. 2 is a cross sectional view of the quick change mold core assembly shown in FIG. 1 showing the mold core attached by a slip ring locking structure to a core retainer, the core retainer being fixed to a platen of the molding machine.

Additional details of construction of the quick change mold core assembly 10 of the present invention is shown in FIG. 2. The core 14 envelopes a cooling post 48 which includes a central channel 50 for directing cooling liquid such as water from a source channel 52 in tail piece 17 to the lower most end of core 14. The cooling liquid returns by way of the space 54 between the core 14 and the cooling post 48 and exits through drain channel 56 in tail piece 17. The tail piece 17 is secured to the core retainer 16 by locating pin 58 and fastener 60.

Figure 3:
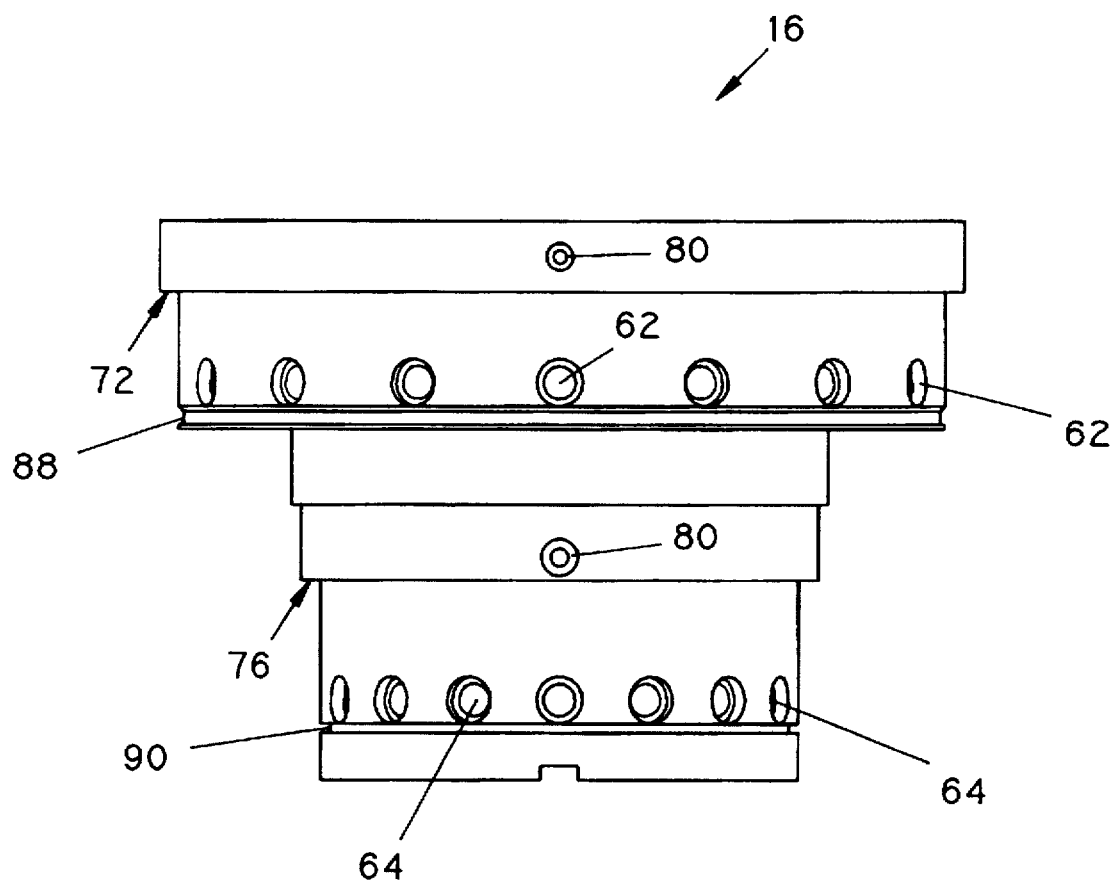
FIG. 3 is a side elevation view of a core retainer employed in FIG. 2.

The core retainer 16, shown in greater detail in both FIG. 2 and FIG. 3, includes an upper ring of openings 62 and a lower ring of openings 64. Each of the openings 62 and 64 receive a ball 66. The balls 66 are retained in openings 62 by coupling ring 44 while the balls 66 and retained in openings 64 by coupling ring 46. The coupling rings 44 and 46 are biased downwardly by biasing springs 68 and 70. Biasing spring 68 is situated between shoulder 72 on core retainer 16 and step 74 on ring 44. In like manner, biasing spring 70 is situated between shoulder 76 on core retainer 16 and step 78 on ring 46. The downward movement of rings 44 and 46 is restricted by retaining rings 84 and 86 which are engaged in circular grooves 88 and 90, respectively. With the coupling ring 44 in the lowest position permitted by the retaining ring 84, the balls 66 in openings 62 are held into a circular groove 94 in spacing ring 42. In like manner, when the coupling ring 46 is in the lowest position permitted by the retaining ring 86, the balls 66 in openings 64 are held into a circular groove 92 in core 14.

The coupling rings 44 and 46 are restricted from upward movement by pins 80 which contact an upper edge of the rings. The rings can be rotated to align a slot 82, shown in FIG. 1, with each of the pins 80 to permit upward movement of the rings with respect to the core retainer 16, which movement will be limited by the vertical length of the slots 82. As ring 44 is moved upward against the biasing force of spring 68, the outwardly angled lip 96 on the lower edge of ring 44 permits the balls 66 to move outwardly from groove 94, thus releasing spacing ring 42. In a similar manner, ring 46 can be moved upward against the biasing force of spring 70 exposing the outwardly angled lip 98 on the lower edge of ring 46 which permits the balls 66 to move outwardly from groove 92, thus releasing core 14. The core retainer structure including the coupling ring 46 and balls 66 permits very quick changes of mold cores without the need of special tools or the removal of mold bases from the machine. The use of the coupling ring 44 for fast replacement of the spacer ring 42 eliminates any need for the realignment of the other mold elements when one mold core is replaced with another of a different dimension.

Figure 4:
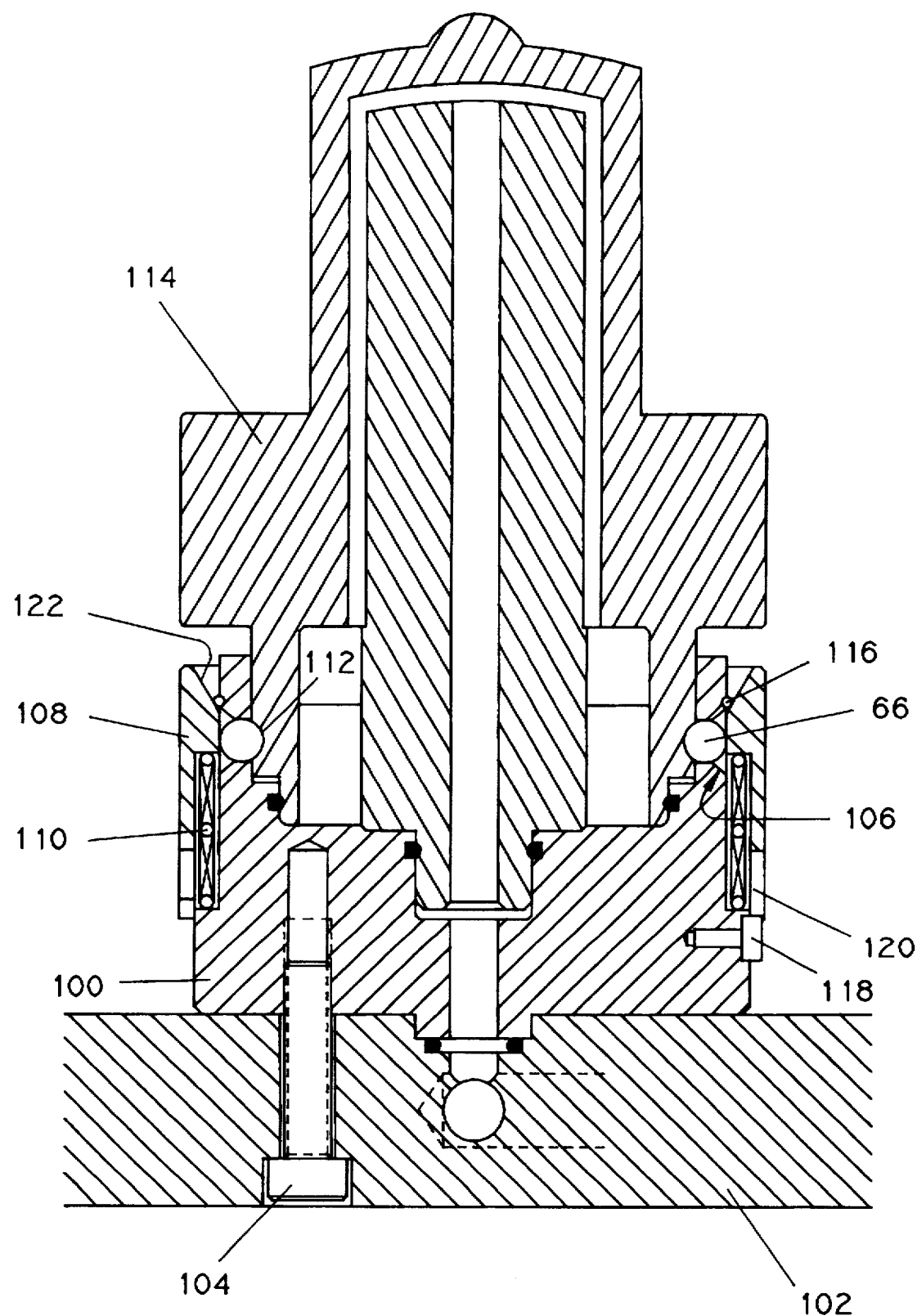
FIG. 4 is a cross sectional view of a blow mold push-up using the quick change features of the present invention.
Figure 5:
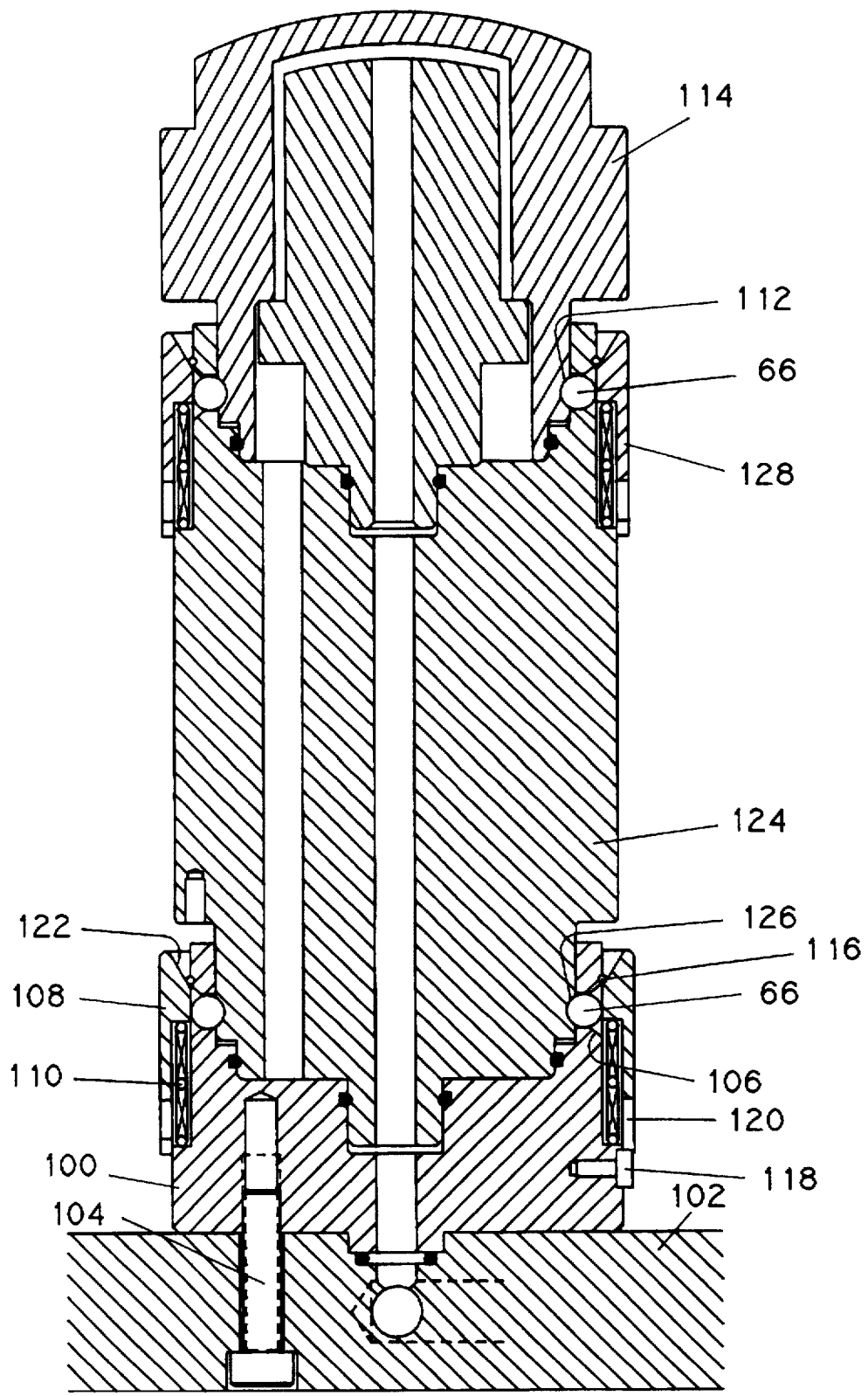
FIG. 5 is a cross sectional view of another blow mold push-up and extension coupled to the same support as shown in FIG. 4.

A similar arrangement can be employed to support the push-up portion of a blow mold used in the manufacture of plastic bottles as shown in FIGS. 4 and 5. A push-up support 100 is fixed to push-up plate 102 by fasteners 104. The push-up support 100 includes a circular array of openings 106 similar to openings 62 and 64 in core retainer 16. A ball 66 is received in each opening 106. Coupling ring 108 biased upward by spring 110 holds the balls 66 in groove 112 of push-up 114. The coupling ring 108 is retained from further upward movement by retaining ring 116. The coupling ring 108 is locked in the illustrated position by locking pins 118 engaging a lower edge of ring 108. The coupling ring 108 includes a slot 120 adapted to receive locking pin 118 to allow limited downward movement of the ring 108 to permit limited outward movement of balls 66 toward inclined lip 122 whereby pushup 114 can be disengaged from support 100.

When substituting one push-up 114 for another as shown for example by comparing FIGS. 4 and 5, the change in dimension of the article to be formed may be such as to require the use of an extension member 124. The extension member 124 includes at a lower end a peripheral groove 126 for receiving balls 66 held by support 100. The extension member 124 also includes at its upper end a quick change feature including coupling ring 128 acting to hold balls 66 in groove 112 of push-up 114 in a manner similar to support 100. The quick change features of extension member 124 and support 100 permit very quick changes of mold push-ups without the need of special tools.

As will be appreciated by those skilled in the art, alternative locking mechanisms held in position by a slip ring or other lock control mechanism are also contemplated by the present invention. For example, movable pins, rollers, or slides can also be substituted for the described ball and groove lock mechanism. While the present invention has been described in connection with certain specific embodiments, it should be understood that the specific examples are not intended to limit the invention as set forth in the following claims.

The invention claimed is:

1. A mold core assembly for removable installation in a molding machine including a core retainer, the mold core assembly comprising a first lock element attached to a core and defining a circumferentially extending peripheral groove, a second lock element including a plurality of balls sized to fit within the peripheral groove and movably attached to the core retainer, the plurality of balls being movable between a locked position fitted in locking connection with the peripheral groove and an unlocked position separated from the peripheral groove, a slip ring positioned to surround the peripheral groove and engage and hold the plurality of balls in the locked position.

2. The mold core assembly of claim 1 wherein the slip ring further comprises an upper edge and a lower lip, the slip ring being positioned to surround the peripheral groove of the core, with the slip ring defining slots that can accommodate projecting pins extending the core retainer, the slip ring being longitudinally movable between an unlocked position with projecting pins fitted into slots in the slip ring to allow the plurality of balls to move out of the peripheral groove and permit removal of the core from its connection to the core retainer, and a locked position with the slip ring rotated from its unlocked position to bring the upper edge of the slip ring into contact with projecting pins, holding the balls in locked connection between the slip ring and peripheral groove of the core.

3. The mold core assembly of claim 2 wherein the lower lip is angled to extend away from the core, with upward longitudinal movement of the slip ring in its unlocked position bringing the lower lip adjacent to the balls held in the peripheral groove and defining a cavity for the balls to expand therein unlocking the core from the core retainer.

4. The mold core assembly of claim 1 further comprising a spring connected between the core and the slip ring and biased to oppose movement of the slip ring toward the core, holding the slip ring in its locked position.

5. The mold core assembly of claim 1 wherein the slip ring further comprises a lower lip angled to extend away from the core, with upward longitudinal movement of the slip ring in its unlocked position bringing the lower lip adjacent to the balls held in the peripheral groove and defining a cavity for the balls to expand therein.

6. A core assembly for removable installation in a molding machine including a core retainer, the mold core assembly comprising first means for locking attached to a core and defining a circumferentially extending peripheral groove, second means for locking including a plurality of balls sized to fit within the peripheral groove and movably attached to the core retainer, the plurality of balls being movable between a locked position fitted in locking connection with the peripheral groove and an unlocked position separated from the peripheral groove, a longitudinally movable slip ring positioned to surround the peripheral groove and engage and hold the plurality of balls in the locked position, and biasing means connected between the core retainer and the slip ring, with the biasing means opposing movement of the slip ring away from the locked position.

7. The mold core assembly of claim 6 wherein the slip ring further comprises an upper edge and a lower lip, the slip ring being positioned to surround the peripheral groove of the core, with the slip ring defining slots that can accommodate projecting pins extending the core retainer, the slip ring being longitudinally movable between an unlocked position with projecting pins fitted into slots in the slip ring to allow the plurality of balls to move out of the peripheral groove and permit removal of the core from its connection to the core retainer, and a locked position with the slip ring rotated from its unlocked position to bring the upper edge of the slip ring into contact with projecting pins, holding the balls in locked connection between the slip ring and peripheral groove of the core.

8. The mold core assembly of claim 7 wherein the lower lip is angled to extend away from the core, with upward longitudinal movement of the slip ring in its unlocked position bringing the lower lip adjacent to the balls held in the peripheral groove and defining a cavity for the balls to drop therein and unlock the core from the core retainer.

9. The mold core assembly of claim 8 wherein the biasing means further comprises a plurality of springs connected between the core and the slip ring and biased to oppose movement of the slip ring toward the core.

10. The mold assembly for use in a molding machine including a mold element having a first surface defining a portion of an article to be molded in the molding machine and a support for supporting the mold element in the machine, the mold assembly further comprising a groove in a second surface of the mold element remote from the first surface, at least a first plurality of balls held in a first circular array of holes in the support, a ring surrounding the first plurality balls causing the balls to engage said groove, the ring including a first edge including an inclined lip and a second edge including at least one slot, at least one pin fixed to the support and engageable by the second edge and sized to be received in the at least one slot to permit movement of the ring in a first direction with respect to the support so that the first plurality of balls can expand outward from said groove into contact with said inclined lip for releasable engagement of the core, and biasing means for biasing the ring against movement in the first direction.

11. The mold assembly of claim 10 further comprising a second plurality of balls held in a second circular array of holes in the support each hole housing one of a second plurality of balls, a spacing ring removably coupled to the support including a peripheral groove situated proximal to the second circular array of holes, a second ring surrounding the second plurality balls causing the balls to engage said peripheral groove, the second ring including a first edge including an inclined lip and a second edge including at least one slot, at least a second pin fixed to the support and engageable by the second ring second edge and sized to be received in the at least one slot of the second ring to permit movement of the second ring in a first direction with respect to the support so that the second plurality of balls can expand outward from said spacing ring peripheral groove into contact with said second ring inclined lip for releasable engagement of the spacing ring, and second biasing means for biasing the second ring against movement in the first direction.

12. The mold assembly of claim 10 further comprising an extension element including a first end having a radial groove dimensioned for engagement by said plurality of balls held in the first circular array of holes in the support, and a second end having a second plurality of balls held in a second circular array of holes in the extension element each hole housing one of a second plurality of balls, the second circular array being dimensioned to receive said groove in said second surface of the mold element, a second ring surrounding the second plurality balls for causing the balls to engage said groove, the second ring including a first edge including an inclined lip and a second edge including at least one slot, at least a second pin fixed to the extension element and engageable by the second ring second edge and sized to be received in the at least one slot of the second ring to permit movement of the second ring in a first direction with respect to the extension element so that the second plurality of balls can expand outward from said groove into contact with said second ring inclined lip for releasable engagement of the mold element, and second biasing means for biasing the second ring against movement in the first direction.

* * * * *